UNITED STATES PATENT OFFICE.

OTTO BRAUN AND OSCAR LIEBREICH, OF BERLIN, GERMANY.

METHOD OF TREATING WOOL-OIL TO PRODUCE LANOLIN.

SPECIFICATION forming part of Letters Patent No. 271,192, dated January 23, 1883.

Application filed November 10, 1882. (No specimens.)

*To all whom it may concern:*

Be it known that we, Dr. OTTO BRAUN and Dr. OSCAR LIEBREICH, of Berlin, Kingdom of Prussia, German Empire, have invented certain new and useful Improvements in Methods of Treating Wool-Oil to Produce Lanolin, of which the following is a specification.

This invention relates to a new manufacture of fatty matter from wool-fat, which may be produced either from the waste liquors of wool-washing works or from ordinary commercial wool-fat.

Our new product, which we have termed "lanolin," is a compound of clean wool-fat with water. It forms an opaque white pasty mass. It is insoluble in water, and when heated splits up into water and wool-fat. When stirred together with water at the ordinary temperature, the wool-fat again absorbs water so as to produce lanolin; but if the lanolin is heated in water it splits up into water and wool-fat. Under the microscope it appears as a homogeneous mass.

Many attempts have already been made to obtain the purest possible fat from raw wool-fat, or from the wool-washing water. The methods used heretofore, however, are ineffective, since in the most favorable case the product obtained is sour and has an unpleasant odor, and if benzine, petroleum, ether, or other like materials are used for the extraction of the fat the odor of the extracting medium also adheres to the product. The reason of this unsatisfactory result is due partly to the carbonic acid which is always evolved by the decomposition of alkaline liquids, and which attaches itself in small bubbles to the little particles of dirt adhering to the fat and carries up a large portion of the heavy earthy admixtures of the fat, so that upon the sour liquid a dirty muddy mass is formed, from which fat can only be obtained by pressing under heat. Furthermore, during the progress of the operation the lyes pass over into putrid fermentation, causing annoyance to the neighborhood and imparting to the resulting fat an obnoxious odor which cannot be removed. Moreover, this method requires much space and a considerable quantity of acid, because the earthy portions, which always contain decomposable lime salts or silicates, must be saturated with the acids necessary for the separation of the fats. Furthermore, there is a loss of material, due to the portion of the fat which remains in the press-cakes. By our method we are enabled to obtain, first, means for the separation of the dirt and unsaponified fat from each other and from the soapy water before the latter has been decomposed by acid; second, means for the production of lanolin, or of a new compound formed of purified wool-fat and water, as above stated.

In carrying out our invention we proceed as follows: The fresh undecomposed waste liquor or lye is passed through a centrifugal machine, in which the dirt and the fat are separated from each other, while the cleansed soap-liquor is continually drawn off by means of a pipe and led directly into the vat which serves for the acidulation. The raw lanolin thus obtained is thoroughly kneaded by suitable machinery in cold flowing water until the water which flows off is as clear as the water which flows in. The raw lanolin is then heated with water, whereby it is split up into water and fat. The latter is skimmed off from the surface and cooled, and for further purification it can be again treated in the centrifugal machine in a melted condition, or it can be dissolved in ether, ethylated or methylated spirits or other solvents, and the solution can be separated from the residue by filtration or other means. The solvents can be recovered by treatment in suitable stills. After the fat has been cleaned, as above stated, it is thoroughly kneaded with water for a long time, and a perfectly white neutral colorless unguent is obtained which is our new product. From the mud deposited in the lowest part of the centrifugal machine a still further portion of lanolin can be obtained by stirring the same up with clean or salt water and again treating it in the centrifugal machine or extracting it, either in a wet or dry condition, by means of a solvent, after which it is treated as above.

Instead of producing our lanolin from wool-washing water it may be obtained from commercial wool-fat by stirring this wool-fat together with water containing carbonate of soda or caustic soda, or any alkali, or a mixture of these to form a thin milky solution, which is treated in the manner above described.

We are aware that wool-oil has been obtained by acidulating the alkaline waters used to remove grease from wool, collecting the gelatinous substance obtained, and treating it with a fixed or volatile oil, the latter being afterward driven off by distillation; also, it has been obtained direct from the wool by washing it with volatile oil or sulphuret of carbon and employing gentle heat, as well as by other methods. All these processes are, however, subject to the objections already mentioned, inasmuch as they affect the product either by the odor adhering thereto or by its positive deterioration in quality, or both.

What we claim as new, and desire to secure by Letters Patent, is—

1. As a new article of manufacture, the product composed of clear wool-fat and water and having the characteristics above set forth.

2. The within-described process for manufacturing wool-fat by first treating wool-washing water or an alkaline solution of commercial wool-fat in a depositing centrifugal machine, then purifying the product and finally treating the same with water, substantially as set forth.

In testimony whereof we have signed our names to this specification in the presence of two subscribing witnesses.

OTTO BRAUN.
OSCAR LIEBREICH.

Witnesses:
MARKUS M. RUSSON,
HUGO M. CHARLES.